United States Patent
Miklós et al.

(10) Patent No.: US 8,189,509 B2
(45) Date of Patent: May 29, 2012

(54) METHOD OF CONTROLLING PACKET DATA TRAFFIC

(75) Inventors: György Miklós, Budapest (HU); Zoltán Richárd Turányi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 563 days.

(21) Appl. No.: 12/224,875

(22) PCT Filed: Mar. 13, 2006

(86) PCT No.: PCT/EP2006/002276
§ 371 (c)(1),
(2), (4) Date: Apr. 9, 2009

(87) PCT Pub. No.: WO2007/104324
PCT Pub. Date: Sep. 20, 2007

(65) Prior Publication Data
US 2010/0150057 A1    Jun. 17, 2010

(51) Int. Cl.
*H04W 4/00* (2009.01)
(52) U.S. Cl. .................. 370/328; 370/310; 370/338
(58) Field of Classification Search .............. 370/230, 370/235, 252, 328, 352, 331, 338, 395.42, 370/389, 390, 329, 349, 400, 401, 467, 469, 370/491; 455/406, 407, 408, 422.1, 433; 709/203, 227, 228
See application file for complete search history.

(56) References Cited

U.S. PATENT DOCUMENTS

| | | | | |
|---|---|---|---|---|
| 6,643,511 B1 * | 11/2003 | Rune et al. | | 455/433 |
| 7,561,513 B2 * | 7/2009 | Baik | | 370/230 |
| 7,958,238 B1 * | 6/2011 | Batz et al. | | 709/225 |
| 2002/0080819 A1 * | 6/2002 | Tsao | | 370/469 |
| 2002/0097709 A1 * | 7/2002 | Haumont et al. | | 370/352 |
| 2002/0101859 A1 * | 8/2002 | Maclean | | 370/352 |
| 2002/0127995 A1 * | 9/2002 | Faccinn et al. | | 455/406 |
| 2002/0159420 A1 * | 10/2002 | Naqvi et al. | | 370/338 |
| 2004/0013116 A1 * | 1/2004 | Greis et al. | | 370/392 |
| 2004/0032865 A1 * | 2/2004 | Kwon | | 370/367 |
| 2004/0213179 A1 * | 10/2004 | Lundin et al. | | 370/329 |

(Continued)

FOREIGN PATENT DOCUMENTS

| | | |
|---|---|---|
| WO | 03/015353 | 2/2003 |
| WO | WO 03015353 A1 * | 2/2003 |
| WO | 03/058996 | 7/2003 |

OTHER PUBLICATIONS

International Search Report for PCT/EP2006/002276, mailed Dec. 26, 2006.
International Preliminary Report on Patentability for PCT/EP/2006/002276, dated Jul. 9, 2008.

(Continued)

*Primary Examiner* — Chi Pham
*Assistant Examiner* — Abdullah Riyami
(74) *Attorney, Agent, or Firm* — Nixon & Vanderhye P.C.

(57) ABSTRACT

The application relates to a method of controlling packet data traffic of a packet service in a communication network 10, where in accordance with the packet service a communication with a terminal 12 involves a terminal serving entity 101 and a gateway entity 102. Furthermore, a decision entity 103 is provided for performing a decision procedure for deciding whether to process packet data traffic from the terminal 12 in the gateway entity 102 of the network 10, or to tunnel the traffic on to a home communication network 13 of the visiting terminal 12.

26 Claims, 6 Drawing Sheets

U.S. PATENT DOCUMENTS

| | | | | |
|---|---|---|---|---|
| 2004/0243720 | A1* | 12/2004 | Haumont et al. | 709/245 |
| 2005/0180382 | A1* | 8/2005 | Kim et al. | 370/349 |
| 2005/0237969 | A1* | 10/2005 | Jung et al. | 370/328 |
| 2007/0011560 | A1* | 1/2007 | Backman et al. | 714/758 |
| 2007/0086441 | A1* | 4/2007 | Kall et al. | 370/352 |

OTHER PUBLICATIONS

"GPRS Roaming Guidelines", Permanent Reference Document No. IR 33, No. Version 320, pp. 1-20, (Apr. 3, 2003).

* cited by examiner

Fig. 7

METHOD OF CONTROLLING PACKET DATA TRAFFIC

This application is the U.S. national phase of International Application No. PCT/EP2006/002276, filed 13 Mar. 2006, which designated the U.S., the entire contents of which is hereby incorporated by reference.

TECHNICAL FIELD

The present invention relates to a method of controlling packet data traffic of a packet service, such as e.g. GPRS, to a decision entity for a packet service in a communication network, and to an address providing entity for a communication network that supports a packet service.

BACKGROUND

The technology described in this application is basically concerned with the optimization of traffic routing of packet data traffic of a packet service, e.g. of packet data traffic of GPRS (General Packet Radio Service). More specifically, the application is directed towards the problem of "local breakout" in the event of roaming. As it is known, a terminal that subscribes to a given communication network (e.g. a wireless terminal that subscribes to a mobile communication network) may often not only attach to the network it subscribes to, which is also referred to as the home network, but also to other networks than the home network, which are then referred to as visited networks. The possibility of attaching to a visited network is referred to as roaming.

One possibility for the handling of packet data traffic in a visited network is such that the traffic from visiting terminals is tunneled to the home network of the visiting terminal, for processing there. However, such a routing of packet data traffic between networks can lead to considerable delays in the packet data communication, which can in turn lead to unsatisfactory performance at the communication endpoints. Delays could be reduced by handling packet data traffic locally in the visited network, which is also referred to as "local breakout". Local breakout will not only reduce delay, but can also improve the transport efficiency.

As a mechanism that can also be used for performing local breakout, GPRS describes the concept of APN (Access Point Name). This will be explained with reference to FIG. 7.

Figure 7:
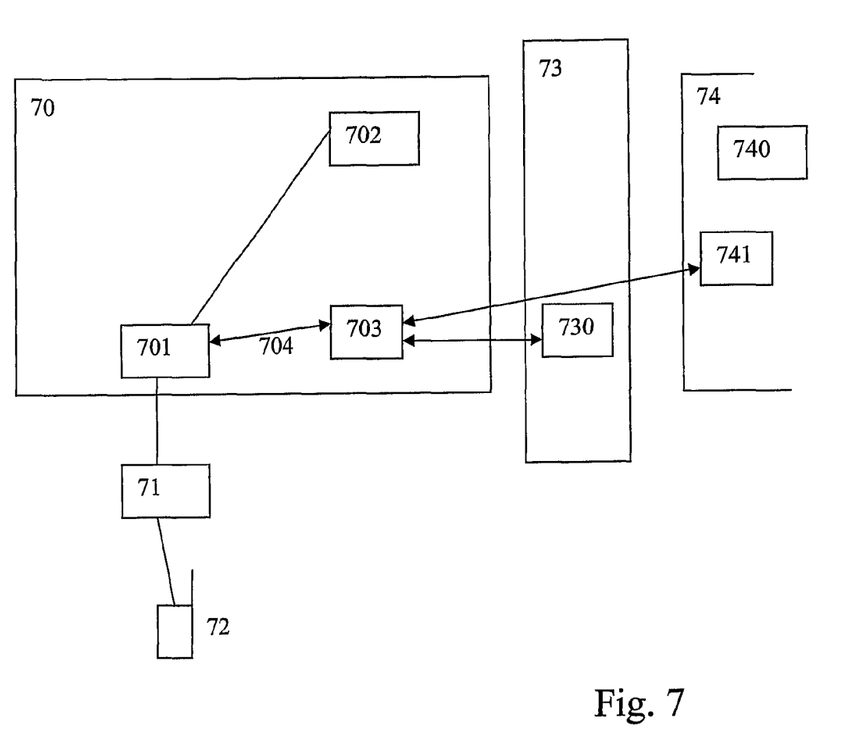
FIG. 7 shows a structure of a conventional GPRS system for explaining the concept of APN.

In FIG. 7 reference numeral 70 describes a communications network in which the roaming wireless terminal 72 is visiting. The terminal 72 interacts with network 70 via an access network (e.g. GERAN (GSM EDGE Radio Access Network)), indicated by 71 in FIG. 7. The access network 71 (which can e.g. comprise base stations and associated control elements, such as Base Station Controllers, Radio Network Controllers, etc.) interacts with an SGSN (Serving GPRS Support Node) 701. The visited network furthermore comprises a GGSN (Gateway GPRS Support Node) 702 and a DNS (Domain Name System) 703. FIG. 7 furthermore shows a GRX (GPRS Roaming Exchange) 73 comprising a DNS 730, and the home network 74 of terminal 72, which comprises a GGSN 740 and a DNS 741.

In accordance with the APN concept, the SGSN 701 is capable of obtaining the address of a GGSN for processing the packet data traffic of the terminal 72. More specifically, the APN is translated into an IP (Internet Protocol) address of a given GGSN using the DNS. The APN has a format comprising a so-called "network ID" that points to an access point within the network, and a so-called "operator ID" that points to a network in terms of an identity of the respective operator. As a consequence, the "operator ID" is generically speaking a network identifier, as it identifies a network. The basic structure of the APN is <network ID>.<operator ID>. gprs.

The visited SGSN 701 interrogates the DNS 703 (see arrow 704), in order to translate an APN into a GGSN IP address. If the DNS 703 in the visited network 70 is unable to provide an IP address for the APN, e.g. because the APN is not supported by the visited network, it turns to the DNS server 730 in the GPX 73. The DNS 730 possibly provides the desired GGSN IP address, or returns a failure notice in which case the DNS 703 queries the DNS 741 of the terminal's home network 74.

Once the GGSN IP address is available at the SGSN 701, it can appropriately perform a PDP (Packet Data Protocol) context towards the indicated GGSN. It sends the "network ID" of the APN, but not the APN "operator ID" to the indicated GGSN. In the example of FIG. 7, the SGSN 701 can therefore perform a PDP context activation towards the GGSN 702 in the visited network 70, which amounts to a local breakout, or towards the GGSN 740 in the home network 74, depending on the APN.

The APN "network ID" can be supplied by the terminal 72, by the network (via a subscription record), or can be a default parameter chosen by the SGSN 701. The APN "operator ID" may be supplied by the terminal 72 as an option, where only the visited network 70 or the home network 74 are possible. If no "operator ID" is supplied, then first the visited network 70 is tried then the home network. A further feature of the APN mechanism is the "VPLMN address allowed" field, which can be set to yes or no. VPLMN stands for visited Public Land Mobile Network and thereby refers to e.g. the visited network 70. With this mechanism the home network 74 can disallow APNs to a visited network. The value of "VPLMN address allowed" is part of the subscription record.

The problem with the APN mechanism is that it does not provide an efficient way to control the packet data traffic. If a single APN is used in the terminal 73, then all traffic must go via the home GGSN 740 or all traffic must go via the local GGSN 702 in the visited network 70. Since the operator of the home network 74 typically desires to have control over at least some of the traffic, this would imply that all traffic is tunneled to the home network 74. If multiple APNs are used in the terminal then it would be possible to separate the traffic into the APNs based on the service and let a part of the traffic go locally in the visited network, and let another part of the traffic go via the home network. However, this requires the configuration of a multiple APN in the terminal on a per service basis and a mapping of applications to a respective APN. A consequence of this is that each service in the terminal 72 will use a separate PDP context, and hence a separate IP address. This leads to complexity in the terminal configuration.

SUMMARY

An object is to provide an improved method and system of controlling packet data traffic of a packet service in a communication network. This object is solved by the subject-matter of the appended independent claims.

In accordance with one aspect of the invention, a decision entity is provided in the visited network. The decision entity receives the packet data traffic from a terminal serving entity (e.g. from a SGSN), and performs a decision procedure for deciding whether to process the packet data traffic in a gateway entity (e.g. a GGSN) of the visited communication network, or to tunnel the packet data traffic onto the home communication network of the visiting packet service terminal.

By adding the decision entity, which is separate from the terminal serving entity, it becomes possible to achieve a number of advantages. The decision entity can operate without any necessity to configure terminals, which is a great advantage over the concept of using multiple APNs. Also, the decision entity can act as an anchor in the visited network, which provides advantages over tunneling all data traffic to the home networks in order to make decisions there. Furthermore, the decision entity nonetheless provides the option of configurability by the operator of the home network, thereby providing control to the operator of the home network without having to tunnel traffic to the home network. Further, the decision entity can be arranged to perform the decision procedure for packet data traffic received from a plurality of different terminal serving entities of the visited network, which again increases the controllability of the handling of packet data traffic.

It is noted that according to a preferred embodiment, the decision entity is provided together with the gateway entity as a single element.

DETAILED DESCRIPTION OF EXAMPLE EMBODIMENTS

Figure 1:
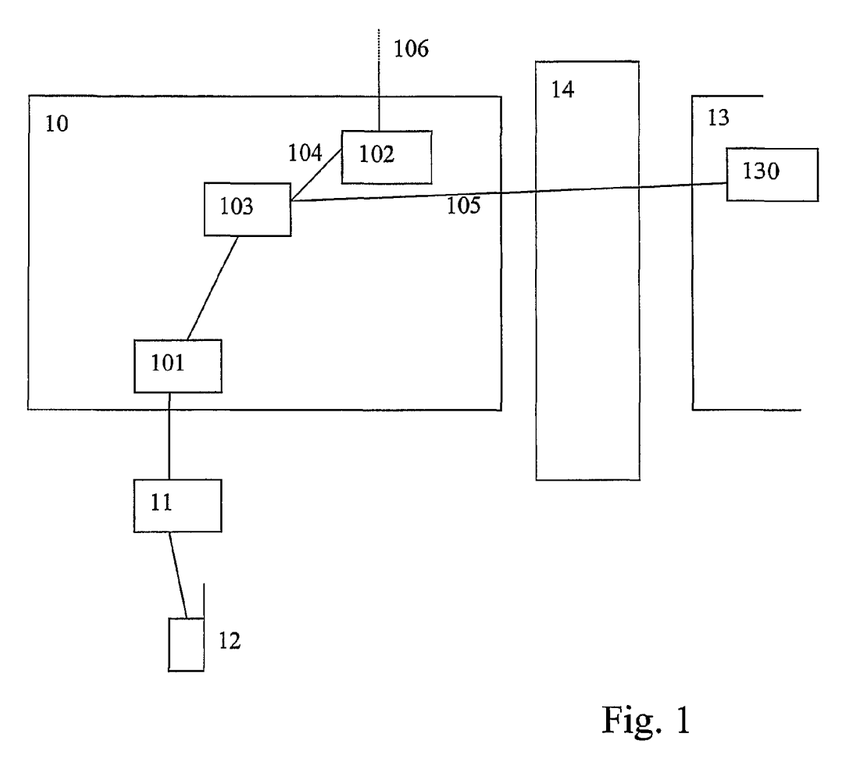
FIG. 1 shows a schematic block diagram of an example embodiment.

FIG. 1 shows a schematic block diagram of a basic embodiment. Reference numeral 10 describes a communication network, e.g. a PLMN that is capable of handling packet data traffic of a packet service, e.g. of GPRS. Reference numeral 101 refers to a terminal serving entity that supports the packet service and is arranged for performing access control with respect to the given packet service terminal referred to as 12 in FIG. 1. The access occurs via an available access network 11. Furthermore, reference numeral 102 relates to a gateway entity that supports the packet service and is arranged for providing interworking with other networks, e.g. with the Internet. As a consequence, the terminal serving entity 101 handles the access of a terminal to the network 10, whereas the gateway entity 102 handles the interworking of packet data traffic with other networks e.g. with other packet data networks. A typical example is that the gateway entity 102 provides interworking towards an arrangement of plural networks, i.e. an inter-network such as the Internet. Therefore, if communication network 10 is a PLMN, then it is possible for a wireless terminal 12 to exchange data units with the Internet via the terminal serving entity 101 and the gateway entity 102, i.e. to perform a local breakout in the event that the terminal 12 is a visiting terminal. As an example, if the packet service is GPRS, then the terminal serving entity 101 can be a SGSN, whereas the gateway entity can be a GGSN.

Although GPRS is a preferred example of a packet service, the invention is by no means restricted thereto, as the invention can be applied within the context of any packet service having the basic structural elements of a terminal serving entity and a gateway entity.

Figure 5:
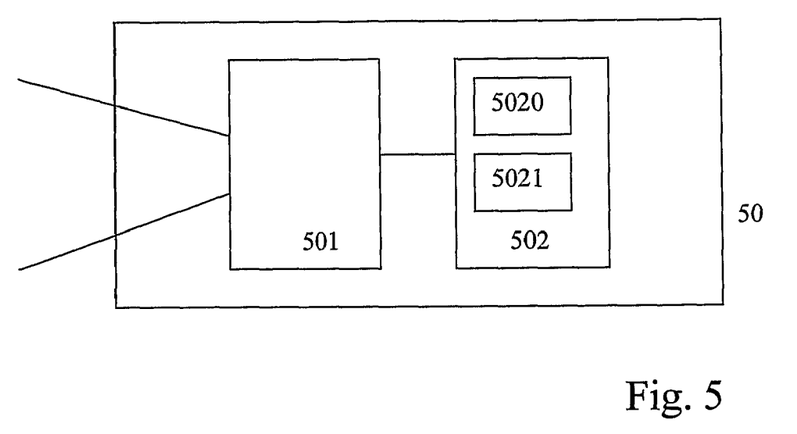
FIG. 5 shows a schematic block diagram of a decision entity.

In accordance with the embodiment of FIG. 1, a decision entity 103 is provided in the communication network 10. FIG. 5 shows a schematic block diagram of such a decision entity 50. The decision entity 50 of FIG. 5 comprises a receiver 501 for receiving tunneled packet data traffic of a visiting packet service terminal 12 from a terminal serving entity (e.g. 101) of the communication network. Furthermore, a controller 502 is provided for performing a decision procedure for deciding whether to process packet data traffic from the visiting packet service terminal in a gateway entity (e.g. gateway entity 102 of FIG. 1) in the communication network, or to tunnel the packet data traffic on to a home communication network (e.g. network 13 in FIG. 1) of the visiting packet service terminal.

It is noted that the above described elements of the decision entity 50 can be provided in any suitable or desirable way, e.g. by hardware, software or any suitable combination of hardware and software. For example, the receiver and controller can be embodied by a buffer and a processor running appropriate software for providing the described functionalities. It is moreover noted that the term "entity" as used in the present description and claims refers to any suitable arrangement of one or more functional elements for providing the described functionality. As such, an entity can be provided by a single physical unit, such as a server or a network node, or can be provided by a plurality of physical units, which may or may not be spread out over the network. Therefore, an entity can also be provided by way of a distributed architecture.

In the example of FIG. 1, the decision entity 103 is shown as separate from the gateway entity 102. According to a preferred embodiment, the decision entity 103 is implemented in the gateway 102, to thereby form a single entity, e.g. a single network node.

Figure 4:
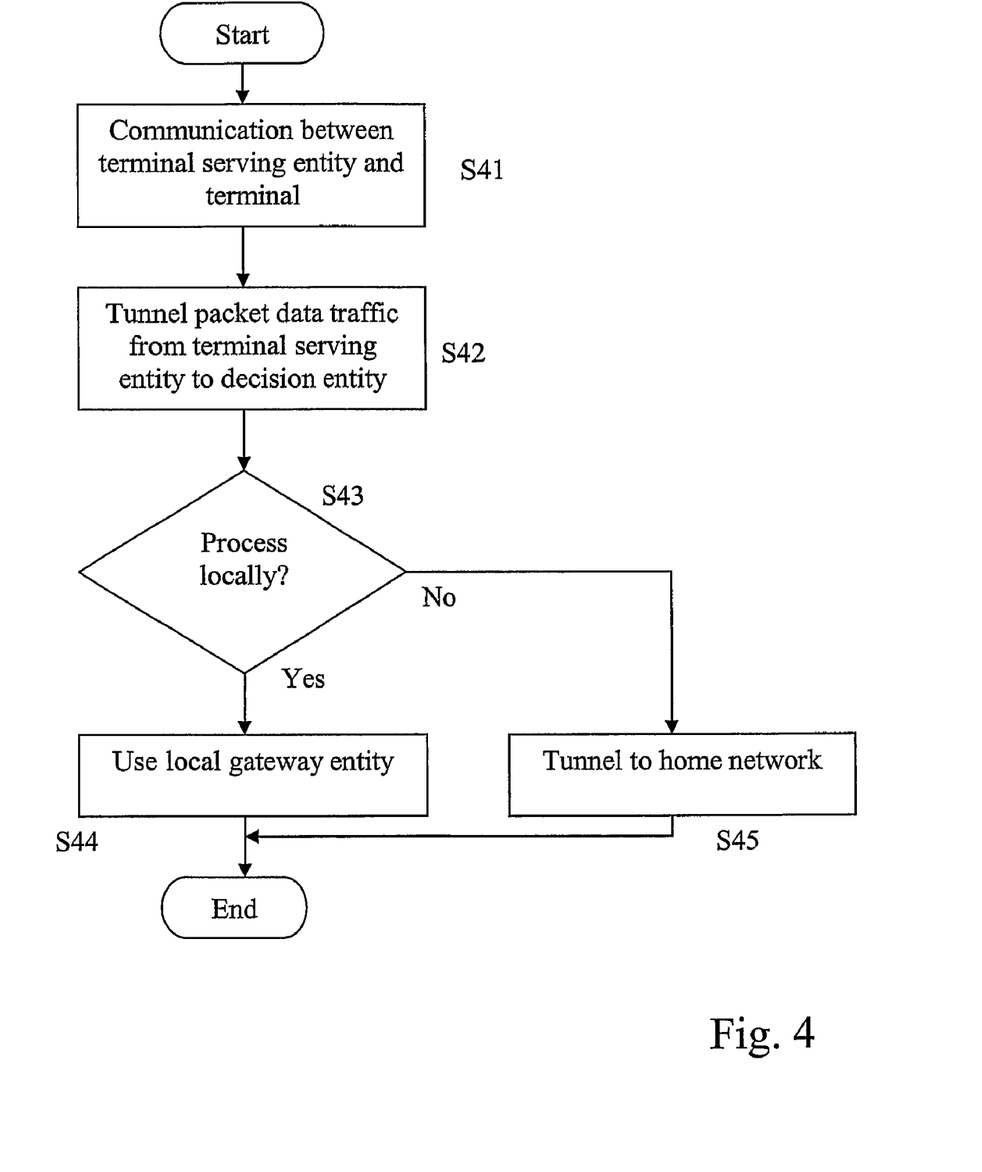
FIG. 4 shows a flowchart of a method.

FIG. 4 shows a flowchart of a method. In a first step S41 a communication between the terminal serving entity 101 of the communication network 10 and the visiting packet service terminal 12 is set up or established. This can e.g. be done via the indicated access network 11. As already explained previously, the term "visiting" indicates that the communication network 10 is not the home network of terminal 12.

In the method of FIG. 4, the packet data traffic is then tunneled from the terminal serving entity 101 to the decision entity 103 see step S42. This can e.g. be achieved by having a default setting in the terminal serving entity 101 according to which all packet data traffic is tunneled to the decision entity 103. The tunneling will be done with a suitable protocol, e.g. with the GPRS Tunneling Protocol (GTP) if the packet service is GPRS. The decision entity 103 then performs a decision procedure S43 for deciding whether to process the packet data traffic locally in a gateway entity of the communication network 10, e.g. the gateway entity 102 (it is noted that there can be a plurality of gateway entities in the communication network 10, where FIG. 1 only shows one gateway entity for simplicity), or to tunnel the packet data traffic on to the home communication network of the visiting packet service terminal 12, which home network is indicated as 13 in FIG. 1. Depending on the outcome of step S43, the packet data traffic is either processed locally, e.g. at gateway entity 102, see step S44 in FIG. 4 and line 104 in FIG. 1, or is alternatively tunneled to the home network, see step S45 in FIG. 4 and line 105 in FIG. 1.

It is noted that the decision in process S43 can be made once for the entire traffic, or can be made on a packet by packet basis. In other words, the steps of FIG. 4 can also be understood as being applied to each packet of the traffic, i.e.

sending a packet to the terminal serving entity (S41), tunneling the packet to the decision entity (S42), making a decision on local processing (S43), and then accordingly treating the packet (S44 or S45).

As can be seen, a communication between networks 10 and 13 is done via a roaming exchange 14, e.g. a GRX if the packet service is GPRS.

It is noted that the above described situation relates to uplink traffic. With respect to downlink traffic, there is no need for a decision regarding a separation into local or home traffic handling. However, one or more of the decision entity 103, the gateway entity 102 and the home gateway entity 130 can be arranged to perform a function of checking downlink traffic towards the terminal 12 and only allowing legitimate local downlink traffic or legitimate downlink traffic through the home network 13.

The decision made in step S43 can be based on any desired parameter and criterion. For example, the decision can be based on a destination address indicated in the packet data traffic. For example, the packet data traffic may comprise data units of a given protocol, such as the Internet Protocol (IP). Then, based on the destination IP address, it can be decided whether to process the packet data traffic locally at gateway entity 102 or to tunnel the packet data traffic to the home network, i.e. the gateway entity 130 of home network 13. Such a feature can be very advantageous if e.g. the visiting network is located far away from the home network (for example the visited network is in Australia and the home network is in Europe), and where a local handling is decided if the destination address is closer to the visited network (e.g. in Australia) and a home tunneling is decided if the destination address is closer to the home network (e.g. in Europe). As can be seen, in the first case a considerable delay in packet transport can be avoided, which should greatly enhance the performance. Another parameter and criterion that can be used for making the decision in step S43 is the type of service selected by the user of the terminal 12.

Figure 2:
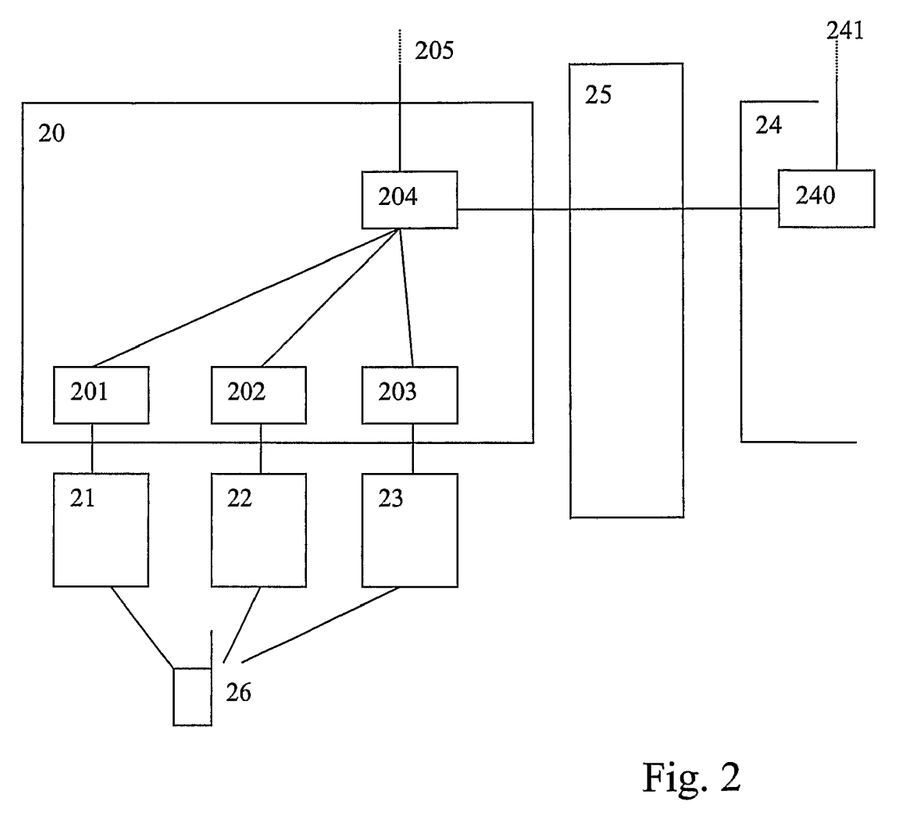
FIG. 2 shows a schematic block diagram of a further example embodiment.

FIG. 2 shows a schematic block diagram of a further embodiment, in which the decision entity has been integrated with the gateway entity into a single entity 204. Furthermore, the example shows three different access networks 21, 22 and 23 (e.g. a GERAN, a UTRAN (UMTS Terrestrial Radio Access), etc.) where each access network has a corresponding terminal serving entity 201, 202 or 203. The gateway and decision entity 204 is arranged to perform the decision procedure for packet data traffic received from the different terminal serving entities 201-203. With respect to the initially described concept of using APNs in terminal serving entities (like SGSNs), the above embodiments have the distinctive advantage of centralizing the decision procedure, which on the one hand makes it more efficient, and at the second time increases controllability, as the configuration and adjusting of the control procedure can be performed at a single centralized entity. In the embodiment of FIG. 2, a visiting packet service terminal 26 can establish a communication with one of the terminal serving entities 201-203 via the respective access network, in order to access the communication network 20. The traffic is then tunneled from the terminal serving entity that is in charge to the decision and gateway entity 204, where a decision is made on whether to process the packet data traffic from the packet service terminal 26 in decision and gateway entity 204, or whether to tunnel the packet data traffic on to the gateway entity 240 of the home network 24 of terminal 26, via the roaming exchange 25. Reference numeral 205 indicates the traffic being handled by the local decision and gateway entity 204, whereas reference numeral 241 indicates the traffic being handled by the home gateway entity 240.

In the example of FIG. 2, a plurality of terminal serving entities can interact with the decision entity shown as 204. Equally, although FIG. 2 only shows one home gateway entity 240, the entity 204 is typically able to communicate with a plurality of such gateway entities of one or more foreign networks. In order to provide compatibility towards existing network nodes and entities, it is preferable to arrange the decision entity in such a way that it acts as a gateway entity towards terminal serving entities that it interacts with. In other words, when considering e.g. the example of FIG. 1, this means that the decision entity 103 appears as a gateway entity to the terminal serving entity 101. As a consequence, even if terminal serving entity 101 is arranged in a conventional manner, e.g. as described in connection with FIG. 7, then it can still interact with the novel decision entity 103. Equally, in order to avoid compatibility problems towards gateway entities inside and outside of its own network, the decision entity, if it tunnels packet data traffic to a given gateway entity preferably acts as a terminal serving entity towards the given gateway entity. In the example of FIG. 1, this means that when decision entity 103 tunnels packet data traffic to one or both of the gateway entities 102 and 130, it then appears to the respective gateway entity as a terminal serving entity. Again, this has the consequence that the gateway entities may be provided in conventional manner and do not have to specifically adapted for interacting with the decision entity. As a consequence, the providing of the decision entity 103 in the above described compatible manner greatly simplifies the implementation of the invention into an existing network, as the terminal serving entities and/or gateway entities do not have to be specifically adapted.

The communication between the individual entities can be done in any suitable or desirable way, and generally will be conducted in accordance with established protocols for the communication networks involved. For example, if the network operates in accordance with GPRS, then the entities within one network, e.g. entities 101, 102 and 103 of network 10 in FIG. 1, may interact according to the Gn interface, whereas the entities of network 10 that interact with an entity of another network, such as the gateway entity 130 of home network 13, may use the Gp interface. These interfaces are well known in the art, such that a further description is not necessary.

Figure 3:
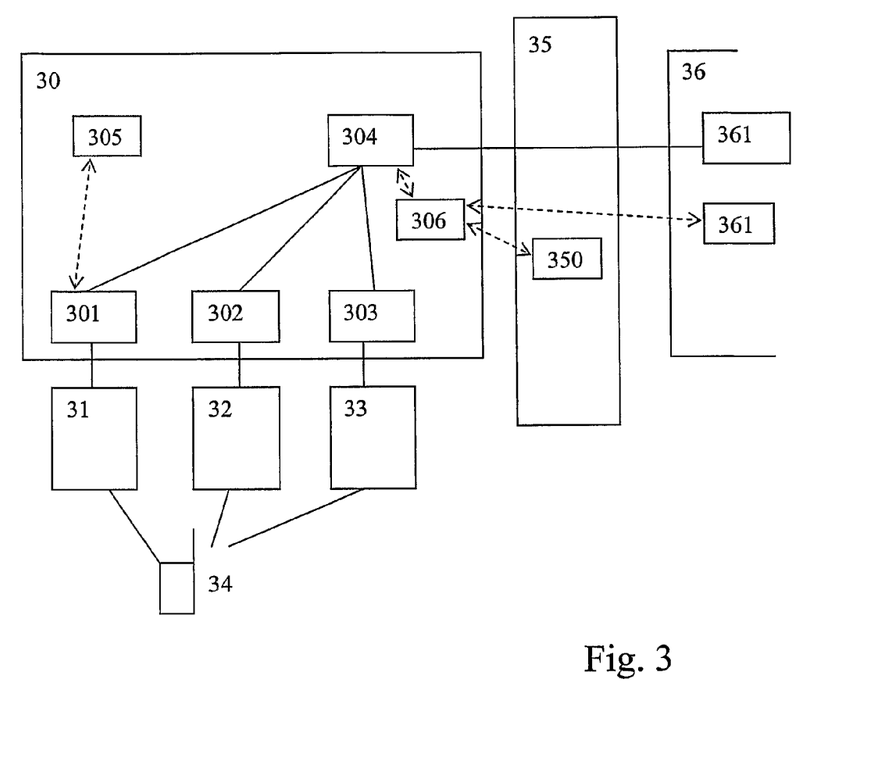
FIG. 3 shows a schematic block diagram of yet a further example embodiment.

Now a further embodiment will be described with reference to FIG. 3. The structure is similar to that of FIG. 2, in that network 30 comprises terminal serving entities 301-303, and a decision and gateway entity 304. Access networks 31, 32 and 33 are provided in association with the respective terminal serving entities 30, 302 and 303, and a visiting packet service terminal 34, e.g. a wireless device, interacts with the network 30 via one or more of the access networks 31-33. Reference numeral 35 describes a roaming exchange, and reference numeral 36 the home network of terminal 34, where said home network comprises a gateway entity 360. In addition to the previous embodiments, FIG. 3 also shows address providing entities 305, 306, 350 and 361, which can e.g. be DNS entities. In the example of FIG. 3, it is assumed that one or more of the terminals serving entities 301, 302, 303 is arranged such that an address query is performed to an address providing entity for an address of an entity to which to tunnel the packet data traffic from the visiting packet service terminal. This is shown by the arrow between entities 301 and 305 in FIG. 3. An example of a terminal serving entity arranged in this way is a conventional SGSN that performs a DNS query on the basis of an APN, in order to obtain an IP address for a GGSN.

Preferably, if the terminal serving entity (e.g. 301) performs the address query based on an entity identifier that comprises a network identification part, the address providing entity (e.g. 305) responds to the address query with an address of the decision entity (in entity 304) at least if the network identification part of the address query indicates the home communication network of the visiting packet service terminal. In other words, the address providing entity 305 is arranged in such a way that although terminal serving entity 301 is performing an address query that would conventionally guide the packet data traffic to the home network, this packet data traffic is nonetheless guided to the decision entity, thereby keeping the decision on whether or not to perform local breakout under the control of the decision entity. An example of a network identification part in the just described means is the "operator ID" of the APN, as the "operator ID" intends to identify a network. The "network ID" of the APN is not necessarily a network identification part within the just described generic sense, as the "network ID" of the APN may in fact describe something within a network.

In the example of FIG. 3, the address providing entity 305 is shown as separate from the terminal serving entities and also separate from the address providing entity 306 that can be queried by decision and gateway entity 304 for obtaining an address for tunneling packet data traffic to a foreign network like home network 36. However, the function of address providing entity 305 can be integrated into the terminal serving entity, e.g. terminal serving entity 301, or can be provided as a part of the general address providing entity of network 30, e.g. the entity 306, which can be the DNS of network 30. In the previous example, it was described that the address providing entity 305 responds to the address query with an address of the decision entity in entity 304 if the network identification part of the address query indicates the home communication network. Naturally, it is possible that the address providing entity 305 always provides the address of the decision entity in entity 304 in response to any address query, thereby guiding all packet data traffic to the decision entity. However, this is not necessary, as it can be desirable to respond to such address queries that comprise a network identification part indicating network 30 itself in such a way that these queries are answered in a conventional fashion, i.e. that the address corresponding to specifically that query is returned. In other words, if e.g. terminal serving entity 301 performs an address query on the basis of an APN, and the APN indicates an entity within network 30, then the address of that indicated entity is returned, even if it is different from the address of entity 304. Thereby, if network 30 e.g. comprises a plurality of gateway entities, and an APN indicates one of these gateways, then the packet data traffic is guided to that desired gateway entity, without bringing the decision entity into play. As a consequence, in such an embodiment, the decision entity only becomes involved if the address query would conventionally guide the packet data traffic out of the visited network 30.

As already mentioned, one or more of the terminal serving entities can be such that they perform an address query based on an entity identifier (e.g. an APN). If the circumstances are such that the entity identifier may or may not identify the decision entity itself (e.g. if the decision entity is a part of a gateway entity that can also be desired by a terminal, such that the terminal provides the entity identifier of the gateway/decision entity to the terminal serving entity), then it is desirable to have a mechanism for informing the decision entity on whether the packet data traffic was intended to be processed in the visiting network, or whether the packet data traffic was intended to go outside of the visited network, and was consequently re-routed, e.g. by the above described mechanism of the address providing entity. One possibility of achieving this is to add signalling from the terminal serving entity to the decision entity. However, this option may not always be available, e.g. due to compatibility constraints with existing implementations. As an example, within the context of GPRS, the Gn interface presently available does not carry the "operator ID" from the SGSN to another entity. Therefore, if such an interface cannot be modified, then a different solution is desirable.

For this purpose a further embodiment is such that the address providing entity (e.g. 305) responds to the address query with a first address of the decision entity in entity 304 if the network identification part of the address query indicates the home communication network 36 of the visiting packet service terminal 34, and with a second, different address of the decision entity 304 if the network identification part of the address query indicates the visited communication network 30. As a consequence, both first and second addresses lead to a tunneling of the packet data traffic to the decision entity, but based on whichever address is used, the decision entity knows whether the packet data traffic was intended to go to the home network (first address) or was intended to be processed in the visited network (second address).

According to a further embodiment, the decision entity, e.g. entity 103 in FIG. 1, is configurable by one or both of an operator of the visited communication network 10 and an operator of the home communication network 13 of the visiting terminal 12. Especially, the configurability by the operator of the home communication network 13 provides the advantage that the home network operator has control over the decision procedure for deciding whether to perform local breakout or not, but without having to tunnel the actual packet data traffic to the home communication network. On the other hand, the configurability by the operator of the visited network provides the advantage that the visited operator achieves a degree of control over the handling of packet data traffic from visiting terminals in his network, which was not achievable in prior art systems.

Now further embodiments will be described, which relate to examples in which the packet data traffic is adapted, in order to make a processing of the data unit traffic in the gateway entity of the visited communication network possible. In these following embodiments, the packets of the packet data traffic are routed in accordance with an inter-network routing address, e.g. an IP address, and one of the decision entity and the gateway entity assigns an inter-network routing address that designates the visited communication network to the packet data traffic, such that the visited communication network appears as the source and destination of the packet data traffic to and from the visiting packet service terminal.

Namely, there exists the basic problem that the visiting terminal, when it e.g. uses an entity identifier identifying a gateway entity of its home communication network, will also employ an inter-network routing address that identifies the home network as the source and destination of the inter-network packets. However, if a local breakout is decided by the decision entity, then the visited communication network must appear in the inter-network as the source and destination of the packets.

According to one embodiment, this can be achieved by letting the decision entity communicate the assigned inter-network routing address that designates the visited communication network to the visiting packet service terminal. The visiting packet service terminal can then accordingly use the assigned inter-network routing address in its packets, such that the corresponding communication partners receiving the packets sent by the visiting packet service terminal will also use the inter-network address assigned by the decision entity or gateway entity of the visited network.

According to a preferred example, the visiting packet service terminal supports an inter-network mobility scheme for mobile devices that comprises the use of a home routing address and a care-of routing address. An example of such a mobility scheme is Mobile IPv6 including the Mobile Ipv6 route optimisation feature, where the care-of routing addresses are referred to as care-of-addresses. In the event of such an inter-network mobility scheme, the visiting packet service terminal preferably uses the assigned inter-network routing address received from the decision entity as such a care-of routing address for the packet data traffic. This again ensures that the packet data traffic will be correctly routed to the visited network.

As an alternative, it is also possible for one of the decision entity and the gateway entity to perform an inter-network routing address replacement in the packet data traffic of the communication. In other words, a home inter-network routing address that identifies the home network of the visiting terminal is replaced in packets coming from the visiting terminal by the assigned inter-network routing address, and the assigned inter-network routing address in packets sent to the visiting packet service terminal is replaced by the home inter-network routing address originally employed by the visiting terminal. Therefore, in this embodiment the visiting terminal is not informed of the fact that a local breakout has been decided and performed in the visited communication, as all of the packets of the packet data traffic sent by the visiting terminal use an inter-network address that relates to the home communication network and equally the packets being received from communication partners over the inter-network equally use that inter-network address. The decision entity and/or gateway entity of the visited network therefore performs a inter-network address translation that effectively hides the local breakout from the visiting terminal.

In accordance with the above embodiments, the decision entity 50 described in FIG. 5 can preferably comprise an address assigner 5020 in the controller 502, where the address assigner 5020 is arranged to assign an inter-network routing address that designates the visited communication network to packet data traffic of the visiting packet service terminal. If the described address replacement is performed, an address replacer 5021 is also provided as a part of the controller 502. It is noted that the address replacer could also be a separate entity outside of the controller. Both the address assigner and the address replacer can be provided in any suitable or desirable way within the decision entity 50, e.g. as computer program elements of a control program running on a processor that embodies the controller 502.

In accordance with the other previously described embodiment, in which the decision entity communicates the assigned inter-network routing address that identifies the visited communication network to the visiting packet service terminal, the controller 502 may also comprise an appropriate communicator (not shown in FIG. 5) for communicating the assigned inter-network routing address.

Figure 6:
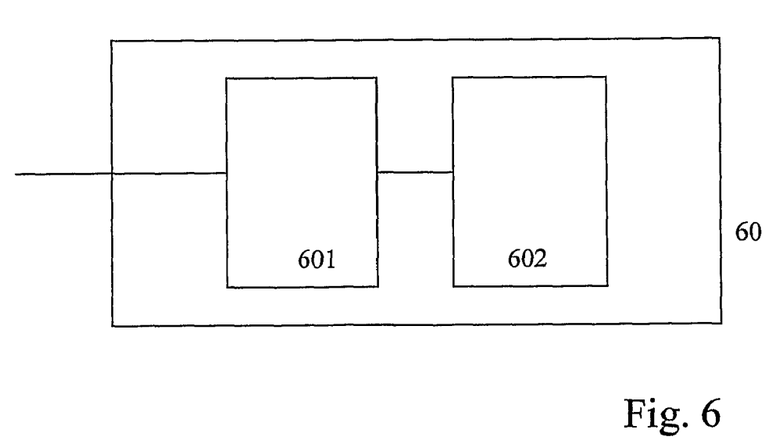
FIG. 6 shows a schematic block diagram of an address providing entity.

Now a further embodiment will be described with reference to FIG. 6. FIG. 6 shows an address providing entity 60, which can e.g. be like the previously described address providing entity 305 of FIG. 3. The address providing entity 60 comprises a receiver 601 for receiving address queries from a terminal serving entity (such as the entity 301 of FIG. 3) of the communication network, where the address queries comprises a network identification part (such as the "operator ID"), and the address providing entity 60 comprises a controller 602 for responding to the address query with an address of the decision entity (e.g. entity 304 in FIG. 3) at least if the network identification part of the address query indicates a home communication network (e.g. network 36 of FIG. 3) of the visiting packet service terminal (e.g. terminal 34 of FIG. 3). As already mentioned previously, it is also possible to arrange the controller 602 in such a way that it will respond to any address query with the address of the decision entity.

As in the case of FIG. 5, the elements of entity 60 shown in FIG. 6 can be provided in any suitable or desirable way, e.g. by hardware, software or any suitable combination of hardware and software. For example, the receiver 601 and controller 602 can be provided by a buffer and a programmable processor, where the program of the processor is designed to provide the described functionality.

Although technology has been described on the basis of detailed embodiments, these are not intended to be limiting, as the invention is defined by the appended claims.

The invention claimed is:

1. A method of controlling packet data traffic of a General Packet Radio Service (GPRS) packet service in a communication network, where in accordance with said packet service a communication with a given packet service terminal involves a terminal serving entity supporting said packet service and arranged for performing access control with respect to said given packet service terminal, and a gateway entity supporting said packet service and arranged for providing interworking with other networks, said method comprising:

setting up a communication between a terminal serving entity of said communication network and a visiting packet service terminal visiting said communication network, wherein said terminal serving entity is a Serving GPRS Support Node (SGSN), tunneling packet data traffic of said visiting packet service terminal from said terminal serving entity of said communication network to a decision entity in said communication network, said decision entity performing a decision procedure for deciding whether the decision entity tunnels said packet data traffic to a gateway entity of said communication network to process said packet data traffic in said gateway entity of said communication network, or tunnels said packet data traffic on to a home communication network of said visiting packet service terminal, the decision entity being arranged to perform the decision procedure for packet data traffic received from a plurality of different terminal serving entities of the communication network.

2. The method of claim 1, wherein said decision entity is implemented in said gateway entity of said visited communication network.

3. The method of claim 1, wherein said decision entity acts as a gateway entity towards said terminal serving entity.

4. The method of claim 1, wherein said decision entity, if it tunnels said packet data traffic on to a given gateway entity, acts as a terminal serving entity towards said given gateway entity.

5. The method of claim 4, wherein said given gateway entity is a gateway entity in the home communication network of said visiting packet service terminal.

6. The method of claim 1, wherein said decision entity is configurable by one or both of an operator of said visited communication network and an operator of said home communication network of said visiting packet service terminal.

7. The method of claim 1, wherein said terminal serving entity, upon the setting up of said communication between said terminal serving entity and said visiting packet service terminal, performs an address query to an address providing entity for an address of an entity to which to tunnel the packet data traffic from said visiting packet service terminal.

8. The method of claim 7, wherein said terminal serving entity performs said address query based on an entity identifier that comprises a network identification part for identifying a network, wherein said address providing entity responds to said address query with an address of said decision entity if the network identification part of said address query indicates the home communication network of said visiting packet service terminal.

9. The method of claim 8, wherein said address providing entity responds to said address query with a first address of said decision entity if the network identification part of said address query indicates the home communication network of said visiting packet service terminal, and with a second address of said decision entity if the network identification part of said address query indicates said visited communication network, said first and second addresses being different.

10. The method of claim 1, wherein packets of said packet data traffic are routed in accordance with an inter-network routing address, and one of said decision entity and said gateway entity assigns for said packet data traffic an inter-network routing address that designates said communication network.

11. The method of claim 10, wherein one of said decision entity and said gateway entity communicates said assigned inter-network routing address to said visiting packet service terminal.

12. The method of claim 11, wherein said visiting packet service terminal supports an inter-network mobility scheme for mobile devices comprising the use of a home routing address and a care-of routing address, where said visiting packet service terminal uses said assigned inter-network routing address received from said decision entity as a care-of routing address for said packet data traffic.

13. The method of claim 12, wherein said inter-network mobility scheme for mobile devices is Mobile IPv6, and said inter-network routing address received from said decision entity is used as an Ipv6 care-of-address.

14. The method of claim 10, wherein one of said decision entity and said gateway entity performs an inter-network routing address replacement in the packet data traffic of said communication, replacing a home inter-network routing address in packets coming from said visiting packet service terminal by said assigned inter-network routing address, and replacing said assigned inter-network routing address in packets sent to said visiting packet service terminal by said home inter-network routing address.

15. The method according to claim 1, wherein said communication network is a wireless communication network and said packet service terminal is a wireless terminal.

16. The method of claim 1, wherein said gateway entity is a Gateway GPRS Support Node (GGSN).

17. A decision entity for a packet service in a communication network, where in accordance with said packet service a communication with a given packet service terminal involves a terminal serving entity supporting said packet service and arranged for performing access control with respect to said given packet service terminal, and a gateway entity supporting said packet service and arranged for providing interworking with other networks, where said decision entity comprises:
 a receiver for receiving tunneled packet data traffic of a visiting packet service terminal from a terminal serving entity of said communication network, wherein said terminal serving entity is a Serving GPRS Support Node (SGSN)
 a controller for performing a decision procedure for deciding whether the decision entity tunnels said packet data traffic from said visiting packet service terminal to a gateway entity of said communication network to process said packet data traffic in said gateway entity of said communication network, or tunnels said packet data traffic on to a home communication network of said visiting packet service terminal, and
 the decision entity being arranged to perform the decision procedure for packet data traffic received from a plurality of different terminal serving entities of the communication network.

18. The decision entity of claim 17, wherein said decision entity is implemented in said gateway entity.

19. The decision entity of claim 17, wherein said decision entity is arranged to act as a gateway entity towards said terminal serving entity.

20. The decision entity of claim 17, wherein said decision entity is arranged such that if it tunnels said packet data traffic on to a given gateway entity, it acts as a terminal serving entity towards said given gateway entity.

21. The decision entity of claim 17, wherein said decision entity is configurable by one or both of an operator of said visited communication network and an operator of said home communication network of said visiting terminal.

22. The decision entity of claim 17, wherein packets of said packet data traffic are routed in accordance with an inter-network routing address, and said decision entity comprises an inter-network routing address assigner arranged to assign for said packet data traffic an inter-network routing address that designates said communication network.

23. The decision entity of claim 22, comprising a communicator for communicating an inter-network routing address assigned by said inter-network routing address assigner to said visiting packet service terminal.

24. The decision entity of claim 22, comprising an inter-network routing address replacer for replacing a home inter-network routing address in packet data traffic coming from said visiting packet service terminal by an inter-network routing address assigned by said inter-network routing address assigner, and for replacing said assigned inter-network routing address in packets sent to said visiting packet service terminal by said home inter-network routing address.

25. An address providing entity for a communication network that supports a packet service, where in accordance with said packet service a communication with a given packet service terminal involves a terminal serving entity supporting said packet service and arranged for performing access control with respect to said given packet service terminal, and a gateway entity supporting said packet service and arranged for providing interworking with other networks, said communication network comprising a decision entity configured to receive packet data traffic from said visiting packet service terminal and decide whether the decision entity tunnels said packet data traffic from said visiting packet service terminal in a gateway entity of said communication network to process said packet data traffic in said gateway of said communication network, or tunnels said packet data traffic on to a home communication network of said visiting packet service terminal, said address providing entity comprising:
- a receiver for receiving an address query from a terminal serving entity of said communication network, wherein said terminal serving entity is a Serving GPRS Support Node (SGSN) said address query comprising a network identification part, and
- a controller for responding to said address query with an address of said decision entity at least if the network identification part of said address query indicates a home communication network of said visiting packet service terminal.

26. The address providing entity of claim 25, wherein said controller is arranged to respond to said address query with a first address of said decision entity if the network identification part of said address query indicates the home communication network of said visiting packet service terminal, and with a second address of said decision entity if the network identification part of said address query indicates said communication network, said first and second addresses being different.

* * * * *

UNITED STATES PATENT AND TRADEMARK OFFICE
CERTIFICATE OF CORRECTION

| | |
|---|---|
| PATENT NO. | : 8,189,509 B2 |
| APPLICATION NO. | : 12/224875 |
| DATED | : May 29, 2012 |
| INVENTOR(S) | : Miklós et al. |

Page 1 of 1

It is certified that error appears in the above-identified patent and that said Letters Patent is hereby corrected as shown below:

In Column 2, Line 10, delete "GPX" and insert -- GRX --, therefor.

In Column 2, Line 47, delete "APN" and insert -- APNs --, therefor.

In Column 12, Line 8, in Claim 17, delete "(SGSN)" and insert -- (SGSN), --, therefor.

Signed and Sealed this
Thirteenth Day of November, 2012

David J. Kappos
*Director of the United States Patent and Trademark Office*